United States Patent
Bowar et al.

(10) Patent No.: US 7,682,106 B1
(45) Date of Patent: Mar. 23, 2010

(54) APPARATUS FOR INSTALLING SLIPLINERS IN PIPES

(76) Inventors: Larry Bowar, 413 N. Kennedy, Belgrade, MT (US) 59714; Daniel Schall, 3608 Fieldstone Dr., Bozeman, MT (US) 59715; Gregory L. Schleining, 268 Cirque Dr., Bozeman, MT (US) 59718

( * ) Notice: Subject to any disclaimer, the term of this patent is extended or adjusted under 35 U.S.C. 154(b) by 514 days.

(21) Appl. No.: 11/525,884

(22) Filed: Sep. 21, 2006

Related U.S. Application Data

(60) Provisional application No. 60/719,712, filed on Sep. 21, 2005.

(51) Int. Cl.
F16L 55/18 (2006.01)
F16L 1/00 (2006.01)

(52) U.S. Cl. ................... 405/184.2; 138/97

(58) Field of Classification Search ........... 405/184.2, 405/184, 183.5; 138/97
See application file for complete search history.

(56) References Cited

U.S. PATENT DOCUMENTS

| | | | |
|---|---|---|---|
| 3,150,397 A | 9/1964 | Caperton | |
| 3,669,329 A | 6/1972 | Blanchet et al. | |
| 3,881,647 A | 5/1975 | Wolfe | |
| 4,362,435 A * | 12/1982 | Henry | 405/184.5 |
| 4,504,171 A * | 3/1985 | Florence, Jr. | 405/184.2 |
| 4,735,270 A | 4/1988 | Fenyvesi | |
| 5,094,340 A | 3/1992 | Avakov | |
| 5,114,634 A * | 5/1992 | McMillan et al. | 405/184.2 |
| 5,188,174 A | 2/1993 | Anderson, Jr. et al. | |
| 5,309,990 A | 5/1994 | Lance | |
| 5,727,904 A * | 3/1998 | Boyer | 405/184.2 |
| 6,280,119 B1 * | 8/2001 | Ryan et al. | 405/156 |
| 6,439,445 B1 | 8/2002 | De Groot et al. | |
| 6,450,386 B1 | 9/2002 | Hessberger et al. | |
| 6,530,432 B2 * | 3/2003 | Gipson | 166/384 |
| 2003/0010505 A1 * | 1/2003 | Gipson | 166/384 |

* cited by examiner

*Primary Examiner*—Frederick L Lagman
(74) *Attorney, Agent, or Firm*—Todd N. Hathaway

(57) ABSTRACT

An apparatus for installing a pipeline slipliner, by pushing rather than drawing the slipliner into the host pipe. The gripper assembly is mounted on the boom of an earthworking machine or other vehicle, such as a track excavator. The gripper assembly includes gripper tracks that engage the exterior of the slipliner and advance it in a linear fashion. The gripper assembly is lowered on a boom into a excavation so as to level with the opening of the host pipe. The gripper assembly is then operated to advance the slipliner into the host pipe, with the slipliner being feed down to the gripper assembly on the surface of the excavation. The gripper assembly resiliently compresses the slipliner to establish a grip that enables it to push the slipliner great distances into the host pipe.

16 Claims, 4 Drawing Sheets

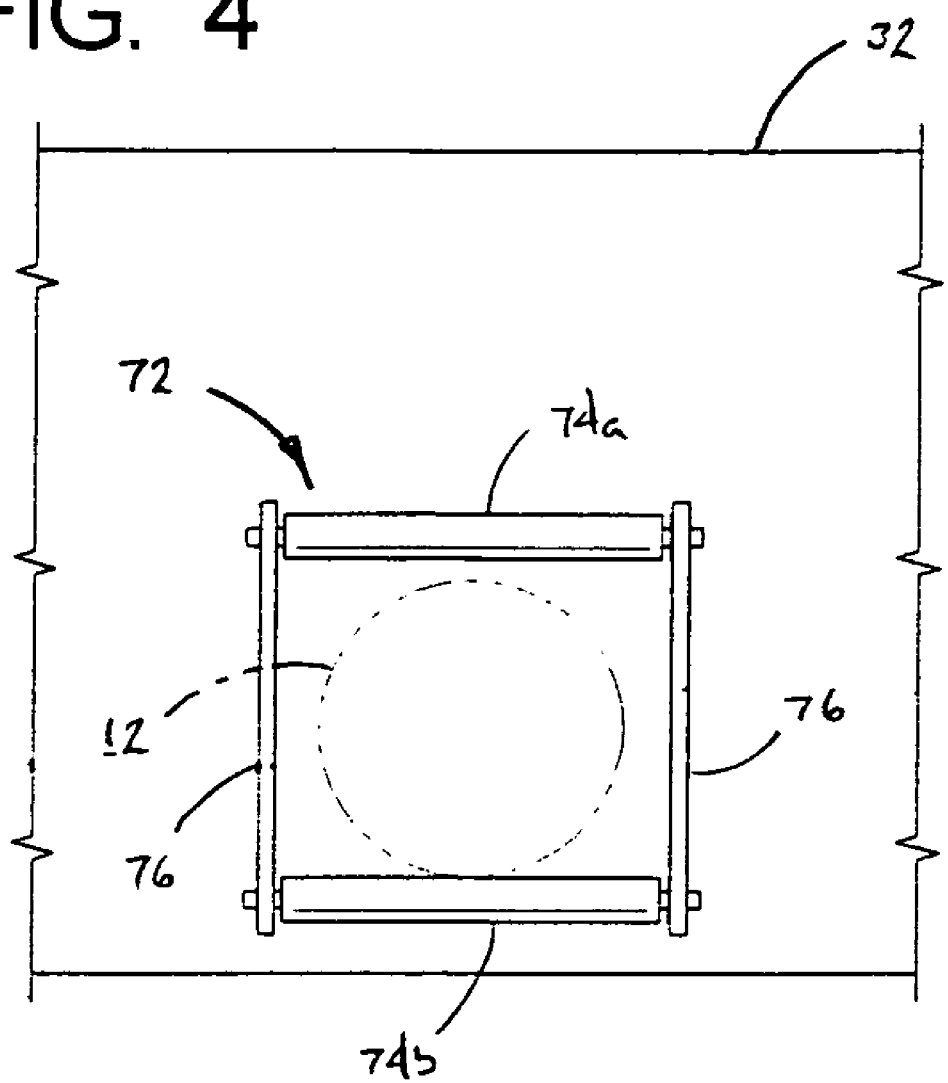

APPARATUS FOR INSTALLING SLIPLINERS IN PIPES

RELATED APPLICATIONS

This application claims the benefit of U.S. Provisional Patent Application No. 60/719,712 filed on Sep. 21, 2005.

BACKGROUND a. Field of the Invention

The present invention relates generally to methods and apparatus for installing slipliners in pipes, and, more particularly, to an apparatus for installing a slipliner by advancing the slipliner into the pipe rather than by pulling it therethrough.

b. Related Art

Sliplining is a technique frequently used to renovate deteriorated pipes and pipelines, such as deteriorated concrete or steel water lines or sewers. The slipliner is typically formed of a plastic material such as high-density polyethylene (HDPE), and has an outside diameter somewhat smaller than the inside diameter of the old pipe so that a gap or "annulus" is formed between the two. In many or most installations, the annulus is filled with cement grout or other material after the slipliner has been put in place.

Although simple in concept, sliplining renovation has long posed a number of challenges from a practical standpoint. Amongst these is the difficulty of actually inserting the slipliner into the old, "host" pipe, often over distances of several hundred feet or more. The conventional approach has been to pull the slipliner into the host pipe, from one access opening towards another. However, this requires first running a cable through the host pipe so that tension can be applied to the end of the slipliner. The usual approach has been to attach a small string to a piece of wood or other float that is then carried through the host pipe by the flow of water/sewage. When the float reaches the next access opening, a slightly larger line is attached to the string and drawn through the host pipe in turn, with the process of being repeated with progressively larger lines and ropes until the actual tension cable can be pulled through to the other end. This process is tedious and grossly inefficient, as well as being highly unreliable: The chip/float or string may get stuck or caught along the way, and even if the attempt is successful, the string or smaller sizes of rope may abraid against damaged areas of the host pipe and part, so that the attempt must be repeated.

Moreover, although most slipliners are installed while water or sewage are flowing through them, there are situations where the host pipe may be "dry" and consequently have no flow for carrying a float and string therethrough. Under these circumstances, an alternative means must be found for threading the line through the host pipe; use of a robotic vehicle is one alternative, but is also slow and inefficient, and again potentially unreliable due to conditions in the deteriorated host pipe.

The delays and inefficiencies that are thus inherent in conventional "pull through" forms of slipliner installation are not inconsequential. To the contrary, they can represent many thousands or even hundreds of thousands of dollars in costs, especially for large projects, when wages, equipment costs, and son on are taken into account.

Accordingly, there exists a need for a method and apparatus for installing slipliners that does not require running a cable through the host pipe in order to pull the slipliner into place. Furthermore, there exists a need for such a method and apparatus that is capable of installing slipliners in a rapid manner. Still further, there exists a need for such a method and apparatus that is capable of installing a slipliner over long distances between access points. Still further, there exists a need for such a method and apparatus that is reliable and effective under field conditions.

SUMMARY OF THE INVENTION

The present invention has solved the problems cited above, and provides a method and apparatus for installing a slipliner by pushing rather than drawing the slipliner into the host pipe.

The apparatus of the present invention comprises a gripper assembly for advancing the slipliner in a longitudinal direction, a boom assembly for lowering the gripper assembly into an access opening so as to be substantially level with a mouth opening of the host pipe therein, and a vehicle having the boom assembly mounted thereto so that the boom and gripper assemblies can be transported to a location proximate the access openings.

The gripper assembly may comprise a plurality of gripper members for engaging an exterior surface of the slipliner, and means for advancing the gripper members along the length of the slipliner. The means for advancing the gripper members may comprise first and second endless chains having the gripper members mounted thereto, the chain members being positioned on opposing sides of an area for receiving the slipliner, and means for driving the endless chains so as to advance the gripper members in a linear direction along the sides of the receiving area. The means for driving the endless chains may comprise first and second drive sprockets in engagement with the chains, and at least one hydraulic motor for selectively rotating the drive sprockets.

The gripper members may each comprise a generally semicircular portion that faces towards the area for receiving the slipliner. The spacing between the gripper members on opposite sides of the receiving area may be less than the diameter of the slipliner so that the slipliner is resiliently compressed within the receiving area so as to establish a firm engagement between the slipliner and the gripper members.

The method of the present invention comprises the steps of providing a gripper assembly for advancing a slipliner in a generally linear direction therethrough, positioning the gripper assembly in generally linear alignment with a mouth opening of a host pipe, and advancing the slipliner through the gripper assembly and into the interior of the host pipe through the mouth opening thereof.

These and other features and advantages of the present invention will be more fully understood from a reading of the following detailed description with reference to the accompanying drawings.

BRIEF DESCRIPTION OF THE DRAWINGS

FIG. 4 is a partial end, cross-sectional view of the gripper assembly of FIG. 2, taken along line 4-4, showing the guide mechanism that supports and aligns the plastic slipliner as it enters the gripper assembly.

DETAILED DESCRIPTION

As noted above, the present invention provides a method and apparatus for installing a slipliner by pushing it into the host pipe, rather than pulling the slipliner by the end.

Figure 1:
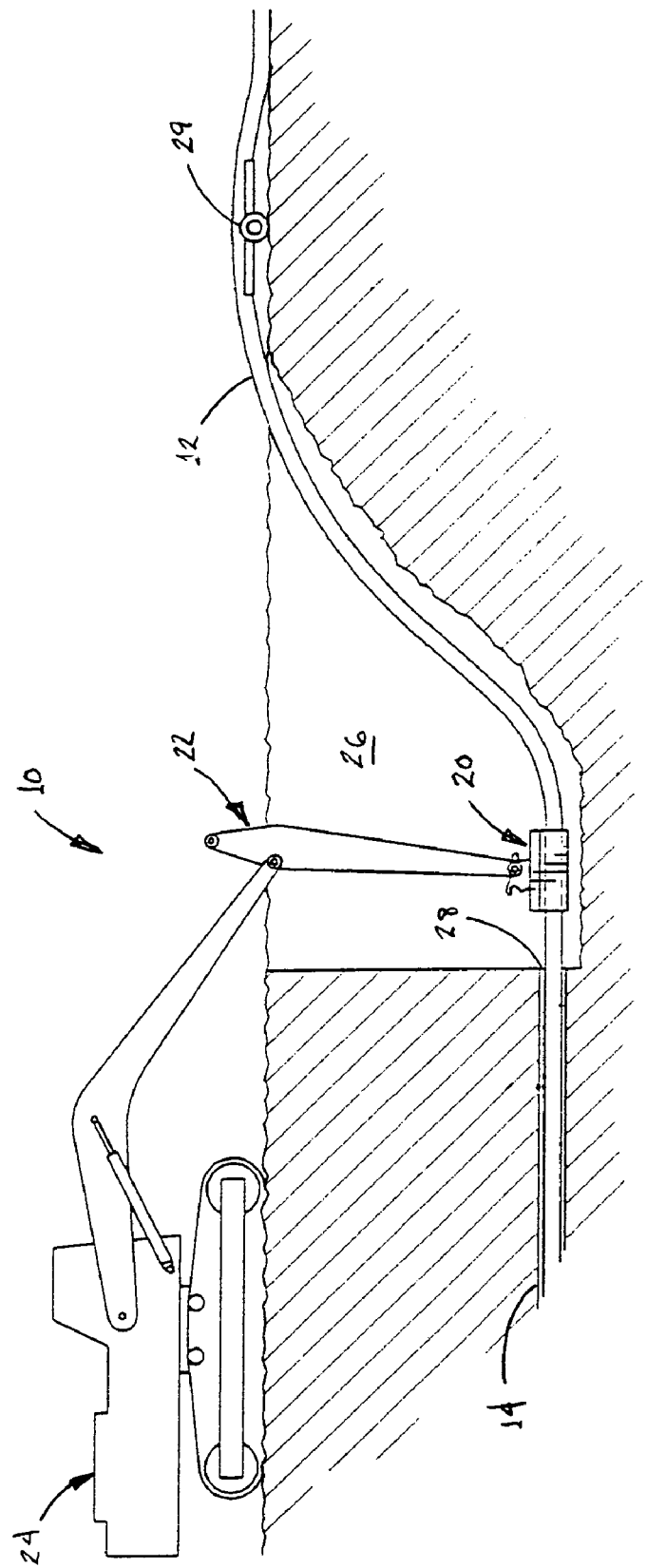
FIG. 1 is an elevational, environmental view illustrating use of a gripper apparatus in accordance with the present invention to advance a plastic slipliner into a host pipe.

Accordingly, FIG. 1 shows an apparatus 10 in accordance with the present invention, advancing a plastic (e.g., HDPE) slipliner 12 into a host pipe 14. As can be seen, the apparatus 10 includes a gripper assembly 20 that is pivotably mounted on the distal end of a boom assembly 22, that in turn is supported from a mobile vehicle 24. In the embodiment that is illustrated, the mobile vehicle 24 is provided by a conventional tracked excavator, however, it will be understood that other suitable forms of earthworking machines and vehicles may be used.

The vehicle 24 enables the apparatus to be brought to a location proximate an access opening, such as the excavation 26 that is shown in FIG. 1. The boom 22, in turn, enables the gripper assembly 20 to be lowered into the opening, to a point approximately level with the mouth 28 of the host pipe, with fine adjustments to bring the two into alignment being possible by pivoting the gripper assembly on the end of the boom.

As will be described in greater detail below, the gripper assembly includes a series of moving gripper members that engage the plastic slipliner so as to advance it linearly therethrough. The slipliner 12 is therefore lead into the opening 26 and through the gripper assembly 20 into the pipe mouth 28, from whence it is advanced into the interior of the host pipe by operation of the gripper assembly. The trailing length of the slipliner is preferably supported on rollers or carts 29, as shown in FIG. 1, in order to facilitate its movement towards and through the gripper assembly.

Figure 2:
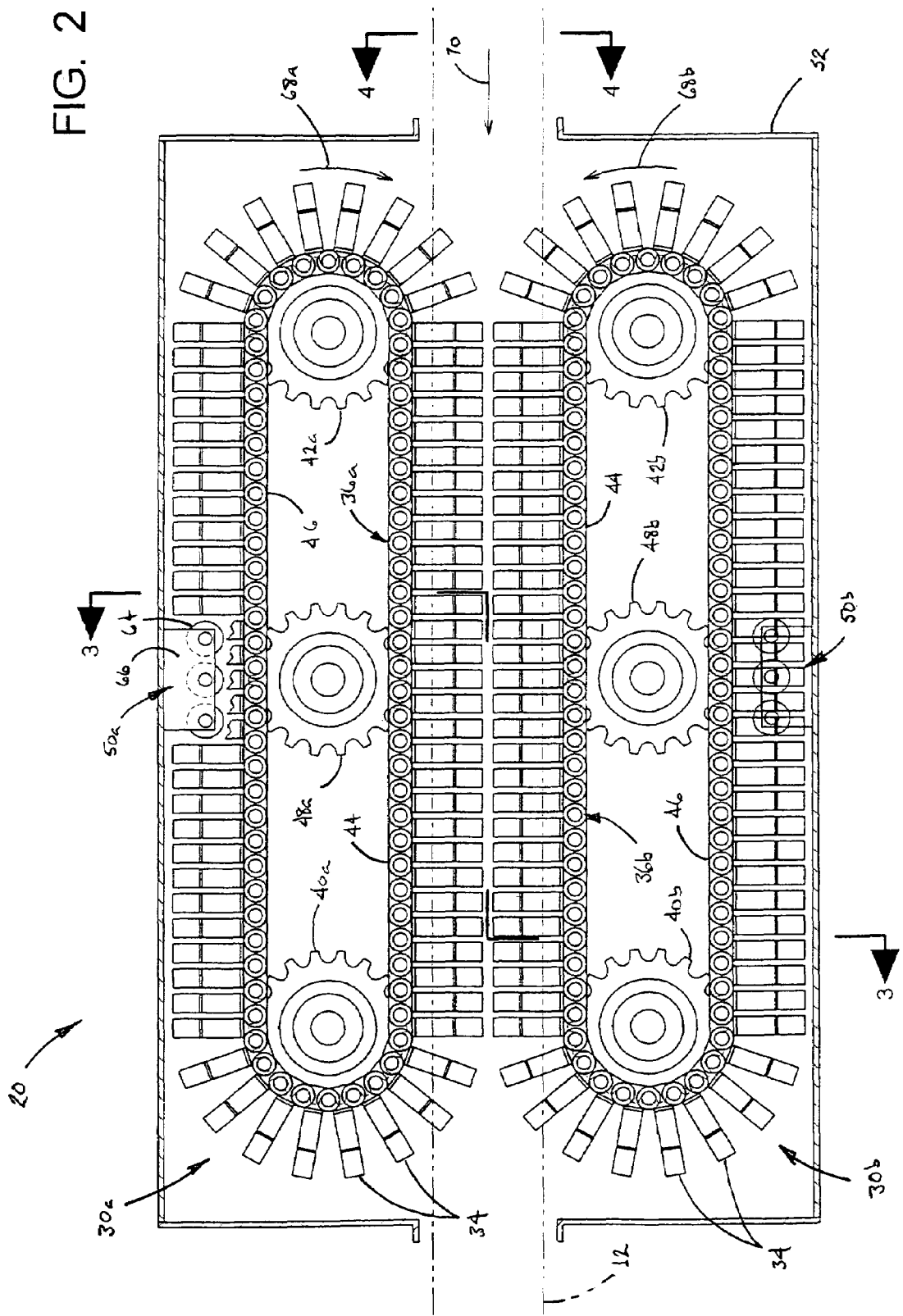
FIG. 2 is a top, cross-sectional view of the gripper assembly of FIG. 1, showing the arrangement of the multiple gripper members that engage the plastic slipliner and the endless chains on which the gripper members are mounted.
Figure 3:
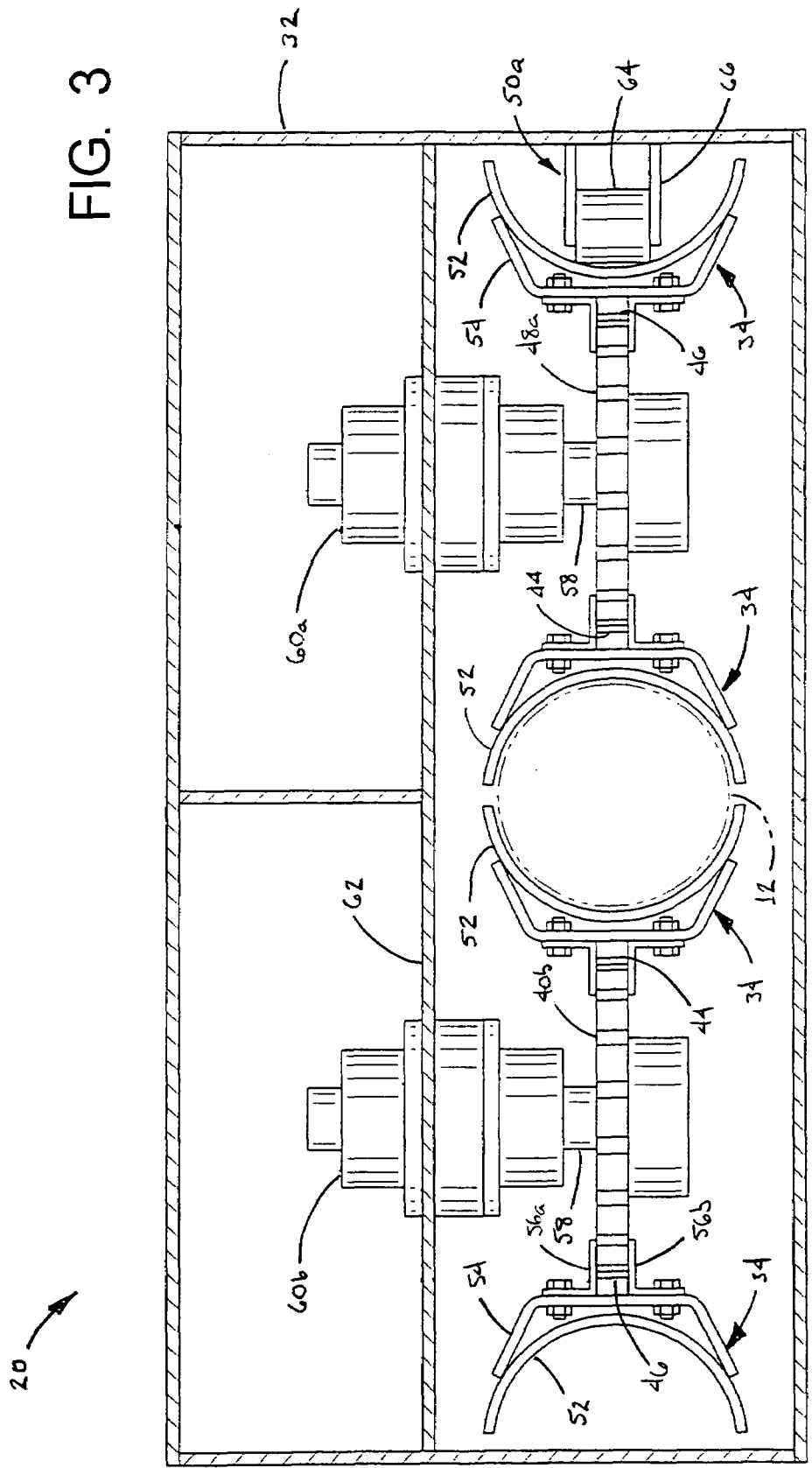
FIG. 3 is end, cross-sectional view of the gripper assembly of FIG. 2, taken along line 3-3 showing the configuration of the gripper members in greater detail, and also the hydraulic motors that rotate the drive sprockets of the assembly.

As can be seen in FIG. 2, the gripper assembly includes first and second endless gripper tracks 30a, 30b, contained within a housing 32. Each of the gripper tracks includes a series of identical gripper members 34 having horizontally disposed jaw openings (see FIG. 3) that are mounted individually to the links of endless chains 36a, 36b. The chains are engaged by vertical shaft and tension sprockets 40a, 40b and 42a, 42b, and extend between them in substantially straight drive and return runs 44, 46. Vertical shaft idler sprockets 48a, 48b of the same size as the other sprockets are mounted between the two runs between the drive and tension ends. Vertical axle roller assemblies 50a, 50b are mounted to the interior of the housing 32 so as to bear against the outboard sides of the gripper tracks across from the idler sprockets 48a, 48b, so as to press the return runs of the chains into engagement therewith. The drive runs 44, in turn, extend parallel to the path of the slipliner, so that a plurality of the gripper elements (29 in the embodiment that is shown in FIG. 2) engage the two opposing sides of the slipliner simultaneously. As can be seen in FIG. 3, each of the gripper members 34 includes a generally semi-circular, horizontally-directed jaw portion 52, as well as a frame portion 54 that supports the sides of the jaw portion, and bracket portions 56a, 56b at which it is mounted to the chain. As a result, when the two rows of gripper members face towards one another from the drive runs 44 of the chains, the jaw portions define a cylindrically shaped receiving area that follows generally the cylindrical contour of the slipliner 12. However, the gap between the opposing surfaces is somewhat less than the outside diameter of the plastic slipliner, so that the walls thereof are compressed resiliently between the gripper members as the slipliner passes through the receiving area. The plastic material of the slipliner allows it to deflect resiliently to a much greater extent than pipes formed of metal or other materials, up to about 15-30 percent in the case of HDPE slipliners. Opposing gripping members is therefore selected to create a deflection of the liner pipe that is significant but still within the acceptable range, suitably about 5-10 percent when using typical HDPE slipliner. The partial compression of the slipliner establishes an exceedingly firm grip without causing damage, enabling the gripper assembly to drive the slipliner forcefully into the host pipe, overcoming the resistance offered by friction and minor debris therein. As can be seen in FIG. 3, the drive sprockets 40a, 40b (40a not visible in FIG. 3) are mounted to the vertical shafts 58 of hydraulic motors 60a, 60b, the latter being supported above the chains and gripper members on a horizontal plate 62 that spans the interior of the housing 32.

As can also be seen with reference to FIG. 3, the roller assemblies 50a each comprise vertical axis rollers 64, supported on brackets 66 that extend from the side walls of the housing so as to bear against the inside surfaces of the jaw portions 52 of the gripper members.

Hydraulic pressure is supplied to the drive motors 60a, 60b from the on-board hydraulic system of the vehicle 24, via suitable hoses and connections (it will be understood that in some embodiments, the hydraulic pressure source may be mounted on the gripper assembly itself). Actuation of the motors causes the drive sprockets to rotate, driving the chains and gripper members in the directions indicated by arrows 68a, 68b in FIG. 2. In so doing, the opposing gripper members move in a forward direction along two sides of the receiving area, advancing the slipliner therethrough in the direction indicated by arrow 70. As is shown in FIG. 4, the slipliner enters the housing 32 via a guide assembly 72 comprised of upper and lower horizontal rollers 74a, 74b and vertical side plates 76, so that the slipliner is brought into alignment with the receiving area between the rows of gripper members. On the discharge side, the slipliner passes through a similar opening and enters the mouth of the host pipe in the manner described above.

The apparatus described above is capable of inserting slipliner into a host pipe in a very rapid and reliable manner. Moreover, it has been discovered that the slipliner can be pushed "into a host pipe over surprisingly long distances, apparently due in part to the manner in which the inside of the host pipe supports the slipliner against buckling; in prototype testing, the apparatus has successfully pushed in excess of 2,700 feet of liner pipe into place."

It will be understood that the vertical/horizontal orientation of the gripper tracks and related components relation to the slipliner is somewhat arbitrary, e.g., the gripper member may oppose one another across a vertical plane rather than horizontal plane as shown, or at some other angle. Moreover, although use of two opposing gripper tracks has been found optimal in terms of operation and efficiently, more (e.g., three or four sets) may be used in some embodiments. Similarly, while the chain drive of the illustrated embodiment is preferred for its efficiency, durability and economy, it will be understood that other types of flexible transmissions (such as belts and cables for example) and drive my be used in some embodiments, as well as electric and other none hydraulic motors.

It is consequently to be recognized that various alterations, modifications, and/or additions may be introduced into the constructions and arrangements of parts described above without departing from the spirit or ambit of the present invention as defined by the appended claims.

What is claimed is:

1. An apparatus for installing a slipliner inside a host pipe, said apparatus comprising:

a gripper assembly that advances said slipliner in a longitudinal direction, said gripper assembly comprising a plurality of gripper members that engage an exterior surface of said slipliner;

means for positioning said gripper member so as to define a substantially fixed-sized gap between opposing sides of a receiving area through which said slipliner passes, said gap being sized less than an external diameter of said slipliner so that said slipliner is resiliently compressed between said jaw portion so as to be deflected by a predetermined amount to establish a firm engagement therewith; and means for advancing said gripper members along a longitudinal length of said slipliner;

a boom assembly that lowers said gripper assembly into an access opening so as to position said gripper assembly substantially level with a mouth opening of said host pipe therein; and a vehicle having said boom assembly mounted thereto so that said boom and gripper assemblies can be transported to a location proximate said access opening.

2. The apparatus of claim 1, wherein said means for advancing said gripper members comprises:

first and second elongate, flexible transmission members having said gripper members mounted thereto, said flexible transmission members being positioned on opposing sides of said receiving area through which said slipliner passes; and means for driving said flexible transmission members so as to advance said gripper members in a linear direction along said opposing sides of said receiving area in engagement with said slipliner.

3. The apparatus of claim 2, wherein said gripper members are mounted in series to said flexible transmission members so as to form substantially continuous gripper tracks.

4. The apparatus of claim 3, wherein said elongate, flexible transmission members comprise:

first and second endless chains mounted on said opposing sides of said receiving area.

5. The apparatus of claim 4, wherein said means for driving said flexible transmission members comprises:

first and second drive sprockets in operative engagement with said first and second endless claims; and at least one motor that selectively rotates said drive sprockets.

6. The apparatus of claim 5, wherein said at least one motor comprises:

a least one hydraulic motor.

7. The apparatus of claim 6, wherein said vehicle compromises:

a hydraulic power source that supplies hydraulic pressure to said at least one hydraulic motor of said gripper assembly.

8. The apparatus of claim 1, wherein said jaw portions of said gripper members each comprise:

a generally semi-circular jaw portion that engages said exterior surface of said slipliner.

9. The apparatus of claim 8, wherein said gripper assembly further comprises:

means for pressing said jaw portions of said gripper members against said exterior surface of said slipliner.

10. The apparatus of claim 9, wherein said means for pressing said jaw portions of said gripper members against said exterior surface of said slipliner comprises:

a plurality of rollers that engage said gripper members on a side opposite said exterior surface of said slipliner.

11. The apparatus of claim 1, wherein said vehicle comprises an earthworking machine.

12. The apparatus of claim 11, wherein said earthworking machine is an excavator.

13. A method for installing a slipliner in a host pipe, said method comprising the steps of:

providing a gripper assembly operative to advance said slipliner in a generally linear direction therethrough;

positioning said gripper assembly in generally linear adjustment with a mouth opening of a host pipe;

resiliently compressing said slipliner in a fixed-size gap between opposing gripper members in said gripper assembly, said gap being sized smaller than a diameter of said slipliner so that said slipliner is deflected by a predetermined amount so as to establish a firm engagement therewith; and operating said gripper assembly so as to advance said slipliner therethrough and into an interior of said host pipe through said mouth opening thereof.

14. An apparatus for installing a slipliner inside a host pipe, said apparatus comprising:

a gripper assembly that advances said slipliner in a longitudinal direction, said gripper assembly comprising:

a plurality of gripper members that engage an exterior surface of said slipliner, said gripper members each comprising:

a generally semi-circular jaw portion that engages said exterior surface of said slipliner, said semi-circular jaw portions of said gripper member defining a gap between said opposing sides of said receiving area, said gap being less than an external diameter of said slipliner so that said slipliner is resiliently compressed between said semi-circular jaw portions to establish a firm engagement therewith;

means for advancing said gripper members along a longitudinal length of said slipliner, said means for advancing said gripper members comprising:

first of second elongate flexible transmission members having said grippers members mounted thereto, said flexible transmission members being positioned on opposing sides of a receiving area through which said slipliner passes;

means for driving said flexible transmission members so as to advance said gripper members in a linear direction along said opposing sides of said receiving area of said receiving area in engagement with said slipliner; and means for pressing said jaw portions of said gripper members against said exterior surface of said slipliner, said means for pressing said jaw portions of said gripper members against said exterior surface of said slipliner comprising:

a plurality of rollers that engage said gripper members on a side opposite said exterior surface of said slipliner;

a boom assembly that lowers said gripper assembly into an access opening so as to position said gripper assembly substantially level with a mouth opening of said host pipe therein; and a vehicle having said boom assembly mounted thereto so that said boom and gripper assemblies can be transported to a location proximate said access opening.

15. An apparatus for installing a slipliner inside a host pipe, said apparatus comprising:

a gripper assembly that advances said slipliner in a longitudinal direction;

a plurality of gripper members that engage an exterior surface of said slipliner; said gripper members each comprising:

a generally semi-circular jaw portion that engages said exterior surface of said slipliner, said semi-circular jaw portions of said gripper members defining a gap between said opposing sides of said receiving area, said gap being less than an external diameter of said slipliner so that said slipliner is resiliently compressed between said semi-circular jaw portions to establish a firm engagement therewith;

means for advancing said gripper members along a longitudinal length of said slipliner;

means for pressing said jaw portions of said gripper members against said exterior surface of said slipliner, said means for pressing said jaw portions of said gripper members against said exterior surface of said slipliner comprising:

a plurality of rollers that engage said gripper members on a side opposite said exterior surface of said slipliner;

a boom assembly that lowers said gripper assembly into an access opening so as to position said gripper assembly substantially level with a mouth opening of said host pipe therein; and a vehicle having said boom assembly mounted thereto so that said boom and gripper assemblies can be transported to a location proximate said access opening.

16. An apparatus for installing a slipliner inside a host pipe, said apparatus comprising:

a gripper assembly that advances said slipliner in a longitudinal direction;

a plurality of gripper members that engage an exterior surface of said slipliner in said slipliner members each comprising:

a generally semi-circular jaw portion that engages said exterior surface of said slipliner, said semi-circular jaw portions of said gripper members defining a gap between said opposing sides of a receiving area through which said slipliner passes, said gap being less than an external diameter of said slipliner so that said slipliner is resiliently compressed between said semi-circular jaw portions to establish a firm engagement therewith;

means for advancing said gripper members along a longitudinal length of said slipliner; and means for pressing said jaw portions of said gripper members against said exterior surface of a said slipliner, said means for pressing said jaw portions of said gripper members against said exterior surface of said slipliner comprising:

a plurality of rollers that engage said gripper members on a side opposite said exterior surface of said slipliner.

* * * * *